(No Model.)
J. PEROTTI.
COMBINATION LOCK AND FOOT SUPPORT FOR BICYCLES.
No. 595,835. Patented Dec. 21, 1897.
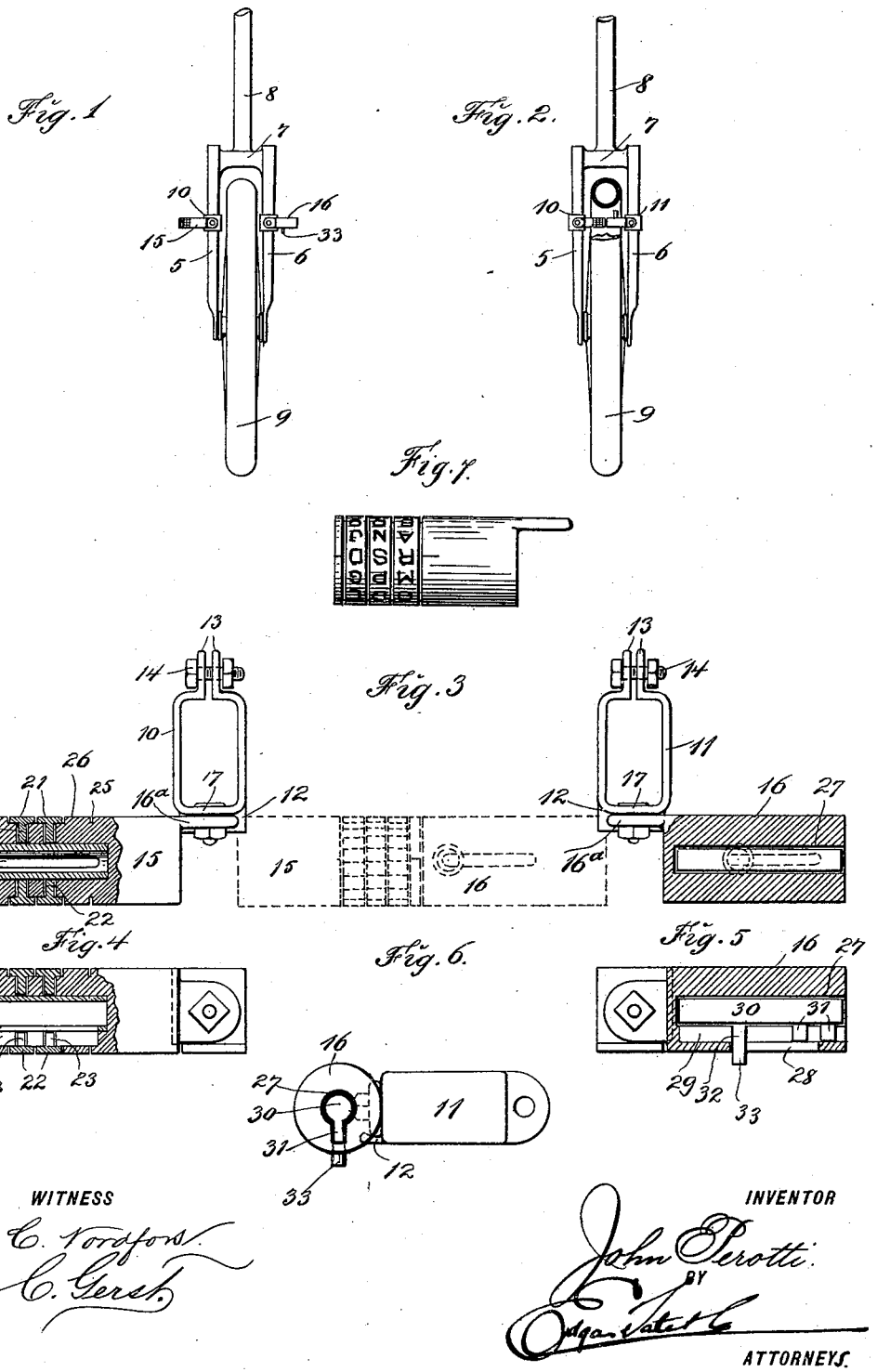
WITNESS
INVENTOR
ATTORNEYS.

UNITED STATES PATENT OFFICE.

JOHN PEROTTI, OF BROOKLYN, NEW YORK.

COMBINATION LOCK AND FOOT-SUPPORT FOR BICYCLES.

SPECIFICATION forming part of Letters Patent No. 595,835, dated December 21, 1897.

Application filed March 30, 1897. Serial No. 630,007. (No model.)

*To all whom it may concern:*

Be it known that I, JOHN PEROTTI, a subject of the King of Italy, residing at Brooklyn, in the county of Kings and State of New York, have invented certain new and useful Improvements in a Combination Lock and Foot-Support for Bicycles, of which the following is a full and complete specification, such as will enable those skilled in the art to which it appertains to make and use the same.

This invention relates to bicycle-locks; and the object thereof is to provide an improved combination-lock which consists of two separate parts which are adapted to be connected with the sides of one of the forks of the vehicle in which one of the wheels is mounted, said separate parts of the lock being adapted to operate when connected with the forward fork of the vehicle as supports for the feet and also to be turned inwardly and locked together, in which position they serve as a lock for one of the wheels.

The invention is fully disclosed in the following specification, of which the accompanying drawings form a part, in which—

Figure 1 is a front view of the guide-wheel of a bicycle and the forward fork in which it is mounted, showing the separate parts of my improved lock connected therewith and turned outwardly, so as to serve as supports for the feet; Fig. 2, a similar view showing a part of the guide-wheel broken away and showing my improvement in a position to serve as a lock; Fig. 3, a plan view of the separate parts of the lock detached from the vehicle, showing the same turned outwardly in full lines, so as to serve as supports for the feet, and also showing the separate parts of the lock turned inwardly in dotted lines, so as to serve as a lock for the vehicle, the separate parts of the lock being also shown in section in full lines; Fig. 4, a sectional side view of that part of the lock shown at the left of Fig. 3; Fig. 5, a sectional side view of that part of the lock shown at the right of Fig. 3; Fig. 6, an end view of that part of the lock shown in Fig. 5, and Fig. 7 a side view of one part of the device.

In the drawings forming part of this specification the separate parts of my improvement are designated by the same numerals of reference in each of the views, and in said drawings I have shown at 5 and 6 the separate sides of the forward fork of a bicycle, which is provided with the usual cross-head 7 and tubular stem 8, and mounted in said fork is the guide-wheel 9; and in the practice of my invention I provide a combined lock and foot-support which comprises two separate similar clamps 10 and 11, which are adapted to be connected with the sides 5 and 6 of the fork of the vehicle, as shown in Fig. 1, and each of these clamps is provided at one end thereof with a projecting shoulder or plate 12.

The clamps 10 and 11 are provided at the ends opposite the shoulders or projections 12 with jaws 13, through which are passed bolts 14, by means of which they are connected with the sides of the forward fork of the vehicle, and I also provide two cylinders 15 and 16, which are provided at one end with shoulders or projections 16$^a$, by means of which they are pivotally connected with the ends of the clamps 10 and 11 over the shoulders or plates 12, as clearly shown at 17.

The cylinder 15 is provided centrally with a longitudinal bore 18, in which is mounted a tubular casing 19, in one side of which is formed a slot 20, and said cylinder is provided with a plurality of rings 21, each of which is provided with an inwardly-directed flange or rim 22, and these flanges or rims are provided with slots 23, and one side of the cylinder 15 is provided with a longitudinal slot 24, which corresponds with that formed in the tubular casing 19.

The rings 21 are held on the tubular casing 19 in any desired manner, but for this purpose I prefer to employ an end ring 24$^a$, which is screwed onto said casing or connected therewith in any desired manner, and in the drawings I have shown two of said rings 21, and the cylinder 15 is also provided adjacent to the inner ring with an annular groove 25, whereby the representation of a third or dummy ring 26 is formed.

The rings 21 are provided on their outer surfaces with the letters of the alphabet, or in place of the letters numerals may be substituted, and the cylinder 16 is also provided with a longitudinal central bore 27, in the bottom of which is formed a slot 28, and formed in said cylinder adjacent to the central longitudinal bore 27 is a slot or groove 29, and mounted in the central longitudinal bore of the cylinder 16 is a locking plug or key 30, which is provided with a plurality of downwardly-directed lugs or projections 31, which equal in number the rings 21, and said locking plug or key is also provided with a downwardly-directed arm or extension 32, which projects through the slot 28 and which is provided with a handle 33.

The operation will be readily understood from the foregoing description when taken in connection with the accompanying drawings and the following statement thereof.

When the cylinders 15 and 16 are turned into the position shown in Fig. 1, they are supported by the plates 12, formed on the clamps 10 and 11, and in this position they will serve as supports for the feet, but when said cylinders are turned into the position shown in dotted lines in Fig. 3 and in full lines in Fig. 2 the central bores in the free ends thereof will register, and said cylinders may be locked together by means of the plug or key 30.

It will be understood that the notches or recesses 23 in the inwardly-directed flanges or rims 22 of the rings 21 are formed to correspond with the letters of the alphabet or the numerals on the surface or perimeters of said rings, and by setting these rings in a predetermined manner and by forming the notches or recesses in a predetermined manner the combination of the lock may, as will be readily understood, be so arranged that it cannot be operated except by a party in possession of a knowledge of the combination.

When the cylinders 15 and 16 are turned inwardly, as shown in Fig. 2, they pass between the spokes of the wheel 9 and thus securely lock said wheel, and it will be apparent that my improved lock may be connected with the rear fork of the vehicle and act as a lock; but in order that the same may serve as a support for the feet and also as a lock it must be connected with the forward fork of the vehicle.

My improved combination-lock and foot-support for bicycles and similar vehicles is simple in construction and operation and is perfectly adapted to accomplish the result for which it is intended, while being also comparatively inexpensive.

Having fully described my invention, I claim as new and desire to secure by Letters Patent—

1. In a lock for bicycles and similar vehicles a cylinder mounted upon each arm of the fork in which one of the wheels is mounted, and adapted to be projected inwardly or outwardly, and means for supporting the same in a horizontal position, said cylinders being adapted to be locked together when projected inwardly, one of said cylinders being provided with a central tubular casing on which is provided a plurality of rings having inwardly-directed flanges, in which are formed notches or recesses, and said rings being provided with letters or numbers on their perimeters, and said tubular casing being provided with a slot which projects through the cylinder in which it is mounted, and the other cylinder being provided with a central longitudinally-movable plug or key which is provided with an extension which projects through the slot in the side of the cylinder, said plug or key being also provided at one side with lugs or projections which correspond in number with said rings, substantially as shown and described.

2. A lock for bicycles and similar vehicles, consisting of two clamps which are adapted to be connected with the sides of one of the forks of the vehicle, said clamps being each provided at one end with a cylinder which is pivotally connected therewith, said cylinders being adapted to be turned inwardly or outwardly, and to be supported in a horizontal position, and said cylinders being adapted to be locked together when turned inwardly, one of said cylinders being provided with a central tubular casing on which is mounted a plurality of rings having inwardly-directed flanges in which are formed notches or recesses, and said rings being provided with letters or numbers on their perimeters, and said tubular casing being provided with a slot which projects through the cylinder in which it is mounted, and the other cylinder being provided with a central longitudinally-movable plug or key which is provided with an extension which projects through the slot in the side of the cylinder, said plug or key being also provided at one side with lugs or projections which correspond in number with said rings, substantially as shown and described.

In testimony that I claim the foregoing as my invention I have signed my name, in presence of the subscribing witnesses, this 29th day of March, 1897.

JOHN PEROTTI.

Witnesses:
C. GERST,
A. C. VAN BLARCOM.